United States Patent [19]

Moos

[11] 4,452,317

[45] Jun. 5, 1984

[54] TRIP MECHANISM

[75] Inventor: Niklaus J. Moos, Burgdorf, Switzerland

[73] Assignee: Versatile Corporation, British Columbia, Canada

[21] Appl. No.: 347,232

[22] Filed: Feb. 8, 1982

[51] Int. Cl.³ .............................................. A01B 61/04
[52] U.S. Cl. .................................... 172/266; 172/709
[58] Field of Search ............................... 172/264–268, 172/261, 709, 710, 711, 705

[56] References Cited

U.S. PATENT DOCUMENTS

| 2,944,613 | 7/1960 | Anderson | 172/266 |
| 3,483,930 | 12/1969 | Detwiller et al. | 172/266 X |
| 3,789,928 | 2/1974 | Njå | 172/709 |
| 4,312,408 | 1/1982 | Hansen | 172/268 X |

FOREIGN PATENT DOCUMENTS

| 2386238 | 12/1978 | France | 172/711 |
| 2428381 | 2/1980 | France | 172/711 |
| 2451152 | 11/1980 | France | 172/268 |

Primary Examiner—Paul E. Shapiro
Attorney, Agent, or Firm—Wenderoth, Lind & Ponack

[57] ABSTRACT

A trip mechanism for a ground working tool connected to a frame. The frame is connected to a carriage using a three point connection. A pivotal member is provided in the frame and a tension member is connected between one arm of the pivotal member and the carriage. Compression springs are provided to act between a second arm and the frame. An obstruction exerting a predetermined amount of force on the ground working tool of the implement will allow the trip mechanism to be activated thus preventing damage to the tool. An adjustable stop is provided on the frame engaging the first arm when the apparatus is in its untripped position to adjust the untripped position of the second arm relative to the frame to vary the initial force required to trip the mechanism.

4 Claims, 4 Drawing Figures

TRIP MECHANISM

INTRODUCTION

This application relates to a trip mechanism and, more particularly, to a trip mechanism for use on a ground working tool on an agricultural implement.

BACKGROUND OF THE INVENTION

Ground working tools are commonly used for a variety of purposes in farming, chiefly cultivation and plowing. Certain soils, however, are heavy with obstructions such as rocks and tree stumps and the ground working tools are subject to damage or destruction if they contact these obstacles. When a blade cultivator is used, the damage can be particularly burdensome because the blade is large and expensive to replace.

There are a variety of trip mechanisms available for use on implements with ground working tools. Most of these trip mechanisms were designed, however, for implements other than blade cultivators. Blade cultivators are particularly demanding on trip mechanisms because of their size and cost. Even those trip mechanisms designed for blade cultivators, however, have drawbacks.

Perhaps the trip mechanism most relevant to the present invention which is part of the prior art is the apparatus disclosed in U.S. Pat. No. 3,789,928 (Nja). The trip mechanism used in that patent is particularly for mouldboard plows and, therefore, certain of the features have reduced utility for cultivators. One feature is the configuration of the bolt mounting. This is so because the mouldboard plow is relatively narrow as compared to a blade cultivator wherein it is desirable to move the blade back, up or to the side depending on where on the blade the obstacle is encountered. The mounting configuration described in the present application is designed to achieve a minimum blade displacement when obstacles are encountered. Further, there are force adjustments which can be made on the present mechanism which are not available on the apparatus disclosed in the Nja specification.

SUMMARY OF THE INVENTION

According to the invention, there is disclosed a trip mechanism comprising a carriage, a frame mounted to said carriage by a first connection comprising a ball joint and a second and third connection, each of said second and third connections being pin and recess means, a pivotal member mounted on said frame, at least two arms extending from said pivotal member, a tension member connected between said carriage and one of said arms of said pivotal member and spring means between said frame and a second arm of said pivotal member.

BRIEF DESCRIPTION OF THE SEVERAL VIEWS OF THE DRAWINGS

An embodiment of invention will now be described, by way of example only, with reference to the accompanying drawings in which:

FIG. 3, appearing with FIGS. 1A and 1B, is a view of the mechanism taken along III—III of FIG. 1A.

DESCRIPTION OF SPECIFIC EMBODIMENT

Figure 1:
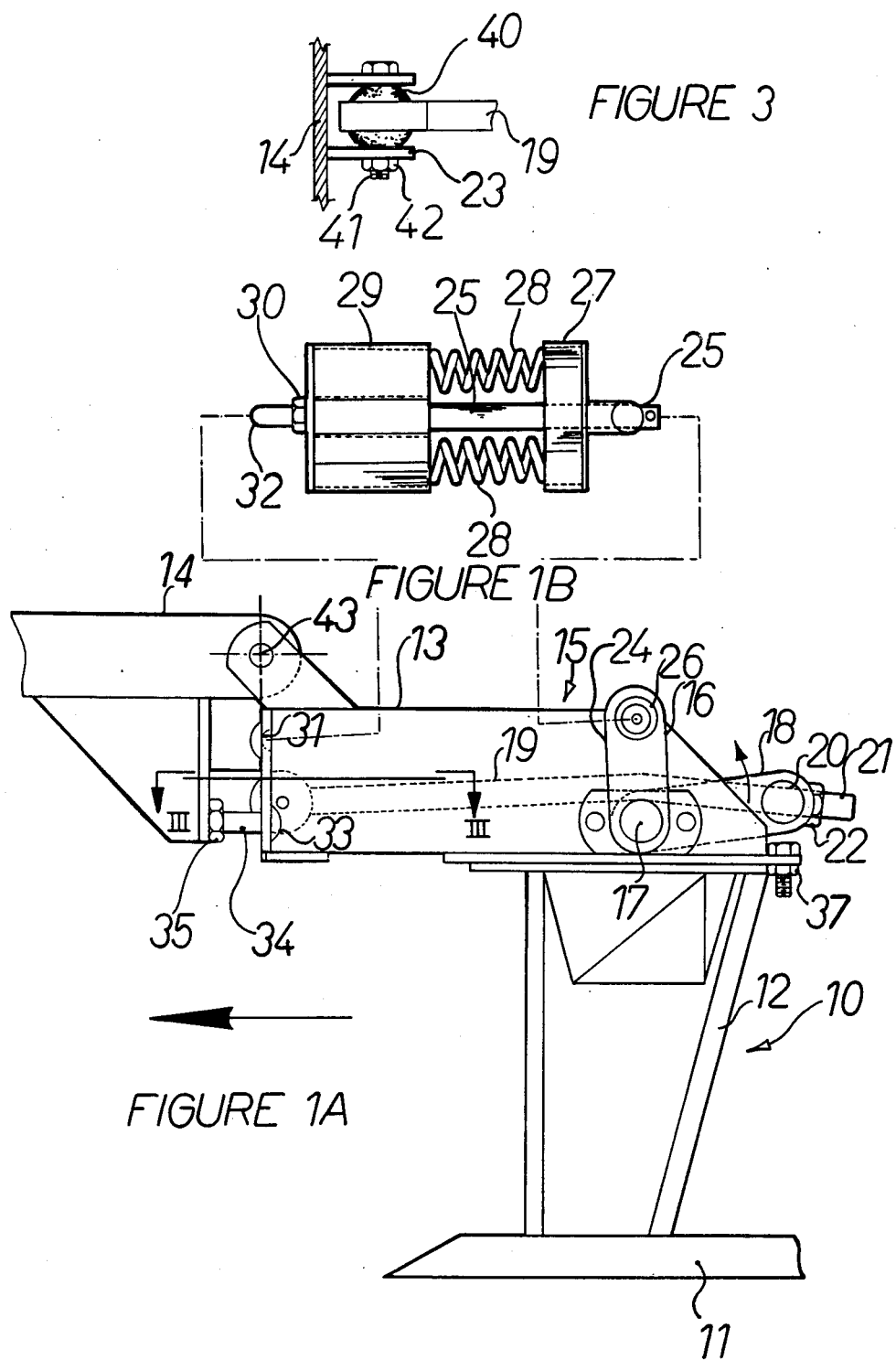
FIG. 1A is a partial side elevation view of the ground working tool showing the trip mechanism attached to the carriage of the implement.
FIG. 1B is a side elevation view of the spring retaining shaft and the compression springs used on the trip mechanism.

Referring now to the drawings, a ground working tool is shown generally at 10 and comprises a blade 11 connected to a shank or standard 12. Standard 12 is mounted to frame 13 which, in turn, is pivotally connected to carriage 14 which forms part of the implement (not shown). The implement is operated by being pulled behind a tractor (not shown).

The trip mechanism is shown generally at 15. It comprises a pivot 16 which rotates about axis 17. Pivot 16 has a first arm 18 divided so as to allow tension member 19 to be mounted therebetween. A pin 20 is mounted between the extensions of arm 18. Tension member 19 has a threaded end 21 and is adapted to be inserted through a diameter in pin 20. A nut 22 is mounted on the end of tension member 19 to tighten tension member 19 and therewith pull frame 13 tight onto pins 34.

The tension member 19 is retained at its opposite end by a balljoint 40 secured by bolt 41 and nut 42 in bracket 23, bracket 23 extending from carriage 14 (FIG. 3). The ball joint 40 allows tension member 19 to move relative to the carriage 14.

Figure 2:
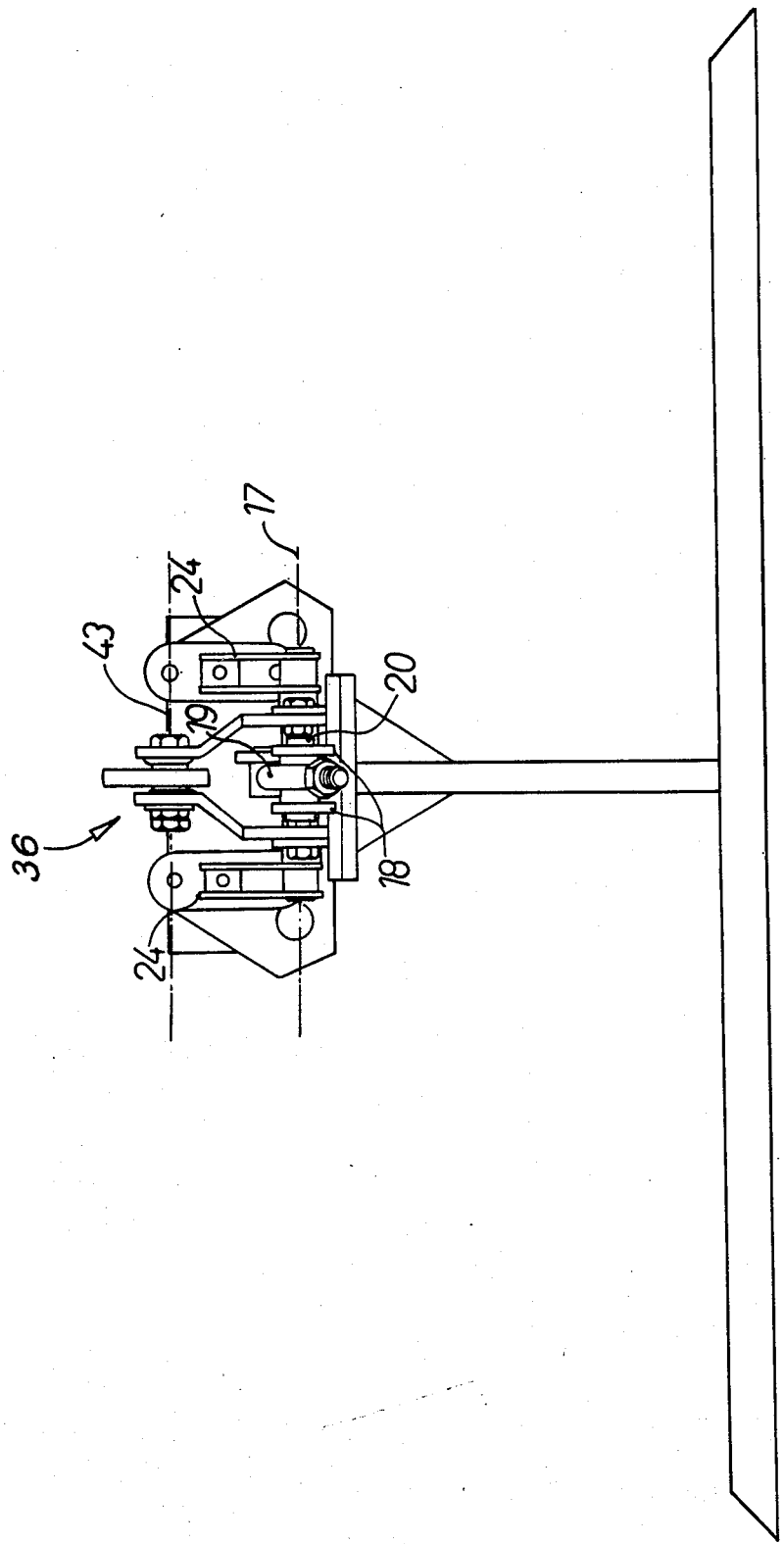
FIG. 2 is a rear view of the trip mechanism.

The pivot 16 has two further arms 24 extending from axis 17 as seen in FIG. 2. These two divided arms 24 are located outside first arm 18 and each acts to retain a respective compression shaft 25 (only one of which is shown in FIG. 1B). Pins 26 pass through each of divided arms 24 and a compression shaft 25 passes through machined diameters in pins 26. Compression shaft 25 has a smaller dimeter than the diameter in pin 26 and it is designed to move through the diameter in pin 26 and in and out relative thereto.

A first retaining collar 27 is mounted on compression shaft 25 and is adapted to slidably move relative thereto. Two compression springs 28 are retained in first retaining collar 27 and extend therefrom to a second retaining collar 29 slidably mounted on the opposite end of compression shaft 25. Shaft 25 is threaded at this end and nut 30 is threaded thereon to retain second retaining collar 29. A recess 31 is positioned in the frame 13 and the rounded end 32 of compression shaft 25 is adapted to fit into and be retained by the recess 31. A second recess 33, oppositely directed from first recess 31, is positioned in frame 13 and is adapted to fit the rounded end of pin 34 which is adjustably mounted in carriage 14 by nut 35.

The frame 13 carrying the trip mechanism 15 is mounted to carriage 14 by ball joint 36 which allows movement so that the frame 13 is allowed to pivot about axis 43 as well as move sidewise.

An adjustment screw 37 is mounted on frame 13 and is adapted to act on pin 20 moving the pin 20 and, therefore, tension member 19, upwardly or downwardly relative to axis 17.

OPERATION

In operation, the carriage 14 of the implement is being pulled to the left as depicted by the arrows in FIG. 1A. When an obstruction is encountered, the blade 11 will commence to rotate upwardly about axis 43 and generally to the side due to the action of ball joint 36. As the blade 11 moved upwardly, tension member 19 causes pivot 16 to rotate counter-clockwise about axis 17. Arm 24 of pivot 16 will move inwardly with pin 26 and since pin 26 moves relative to compression shaft 25, a force will be exerted on first retaining collar 27. First retaining collar 27 will tend to compress compression springs 28 thereby increasing the force tending to return the blade to its untripped working position.

When the obstruction has passed, the blade 11 will return to its normal operating position.

If it is desired to change the force required to activate the trip mechanism 15, adjustment screw 37 and nut 22 may be rotated thus allowing the initial force required to trip the mechanism to be increased or decreased. Likewise, further adjustment is possible by rotating adjustment nut 30. This changes the initial force required to activate the trip mechanism 15 by changing the preload on springs 28 and, as well, changes the force that is necessary to return the blade to its operating position when the obstacle has passed.

Various changes may be made in the invention. For example, the tension member 19 could be a single member such as a flexible cable and since the adjustment screw 37 is simply a means for moving the tension member 19 closer or further to axis 17, it could be mounted in any position where it would be possible to achieve this purpose. Similarly, the compression springs 28 may be located in a number of positions, their primary function being to resist the movement of the blade 11 from its original position. The device described herein, therefore, should only be taken as an illustrative example of the present invention.

I claim:

1. A trip mechanism comprising a carriage, a frame mounted to said carriage by a first connection comprising a ball joint and a second and third connection, each of said second and third connections being pin and recess means, a pivotal member mounted on said frame, at least two arms extending from said pivotal member, a tension member connected between said carriage and one of said arms of said pivotal member, spring means between said frame and a second arm of said pivotal member and an adjustment means between said frame and said arm of said pivotal member connected to said tension member.

2. A trip mechanism as in claim 1 wherein said adjustment means is a bolt.

3. A trip mechanism as in claim 2 wherein said tension member includes an adjustment bolt on said end connected to said pivotal member.

4. A trip mechanism comprising a carriage, a frame mounted to said carriage by a ball joint and first and second pin and recess means, a pivotal member mounted in said frame and having at least two arms extending outwardly from the axis of said pivotal member, a tension member connected between said carriage and a first one of said arms of said pivotal member, spring means between said frame and a second one of said arms of said pivotal member and an adjustment means between said frame and said first arm.

* * * * *